United States Patent
Masuhara

(10) Patent No.: US 8,168,094 B2
(45) Date of Patent: May 1, 2012

(54) METHOD FOR MANUFACTURING DISC AND METHOD FOR MANUFACTURING STAMPER

(75) Inventor: Shin Masuhara, Tokyo (JP)

(73) Assignee: Sony Corporation, Tokyo (JP)

( * ) Notice: Subject to any disclaimer, the term of this patent is extended or adjusted under 35 U.S.C. 154(b) by 67 days.

(21) Appl. No.: 12/542,237

(22) Filed: Aug. 17, 2009

(65) Prior Publication Data

US 2010/0072639 A1   Mar. 25, 2010

(30) Foreign Application Priority Data

Sep. 25, 2008   (JP) .................................. 2008-245355

(51) Int. Cl.
B29D 11/00 (2006.01)
(52) U.S. Cl. ....... 264/1.33; 264/1.37; 264/2.5; 264/400; 425/810
(58) Field of Classification Search .................. 264/1.33, 264/1.37, 2.5, 400, 482; 425/810
See application file for complete search history.

(56) References Cited

U.S. PATENT DOCUMENTS

| 7,175,962 | B2 | 2/2007 | Kouchiyama et al. | |
|---|---|---|---|---|
| 2006/0291369 | A1 | 12/2006 | Yoon et al. | |
| 2008/0185291 | A1* | 8/2008 | Yang et al. | 205/92 |
| 2009/0196826 | A1* | 8/2009 | Gao et al. | 424/9.3 |

FOREIGN PATENT DOCUMENTS

| JP | 2003-217189 | 7/2003 |
|---|---|---|
| JP | 2003-315988 | 11/2003 |
| JP | 2004-348830 | 12/2004 |
| JP | 2007-504591 | 3/2007 |
| JP | 2007-122775 | 5/2007 |

OTHER PUBLICATIONS

Office Action issued Jul. 27, 2010, in Japan Patent Application No. 2008-245355.

* cited by examiner

Primary Examiner — Mathieu D. Vargot
(74) Attorney, Agent, or Firm — Oblon, Spivak, McClelland, Maier & Neustadt, L.L.P.

(57) ABSTRACT

A method for manufacturing a disc includes the steps of performing laser exposure of an inorganic resist master on which a photosensitive layer is formed using an inorganic material, which protrudes in an exposed region, and a surface coat layer is formed on the surface of the photosensitive layer in order to control the shape of protrusion, transferring the shape of protrusion formed by the laser exposure on the inorganic resist master to produce a stamper on which a portion corresponding to the shape of protrusion is a depression, forming a resin substrate using the stamper so that a portion corresponding to the shape of protrusion is a protrusion, and forming a predetermined layer structure on the resin substrate to produce an optical disc.

11 Claims, 15 Drawing Sheets

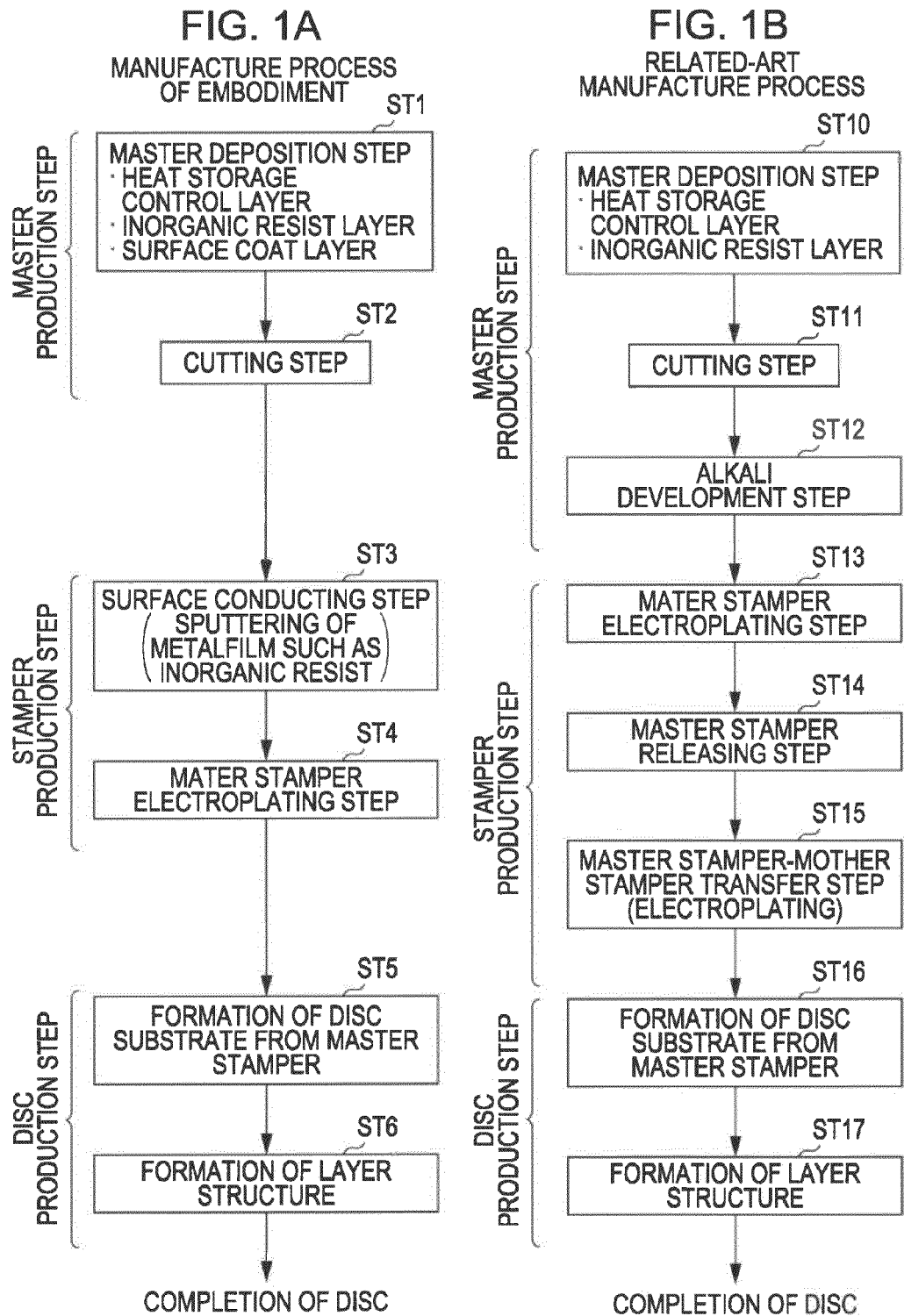

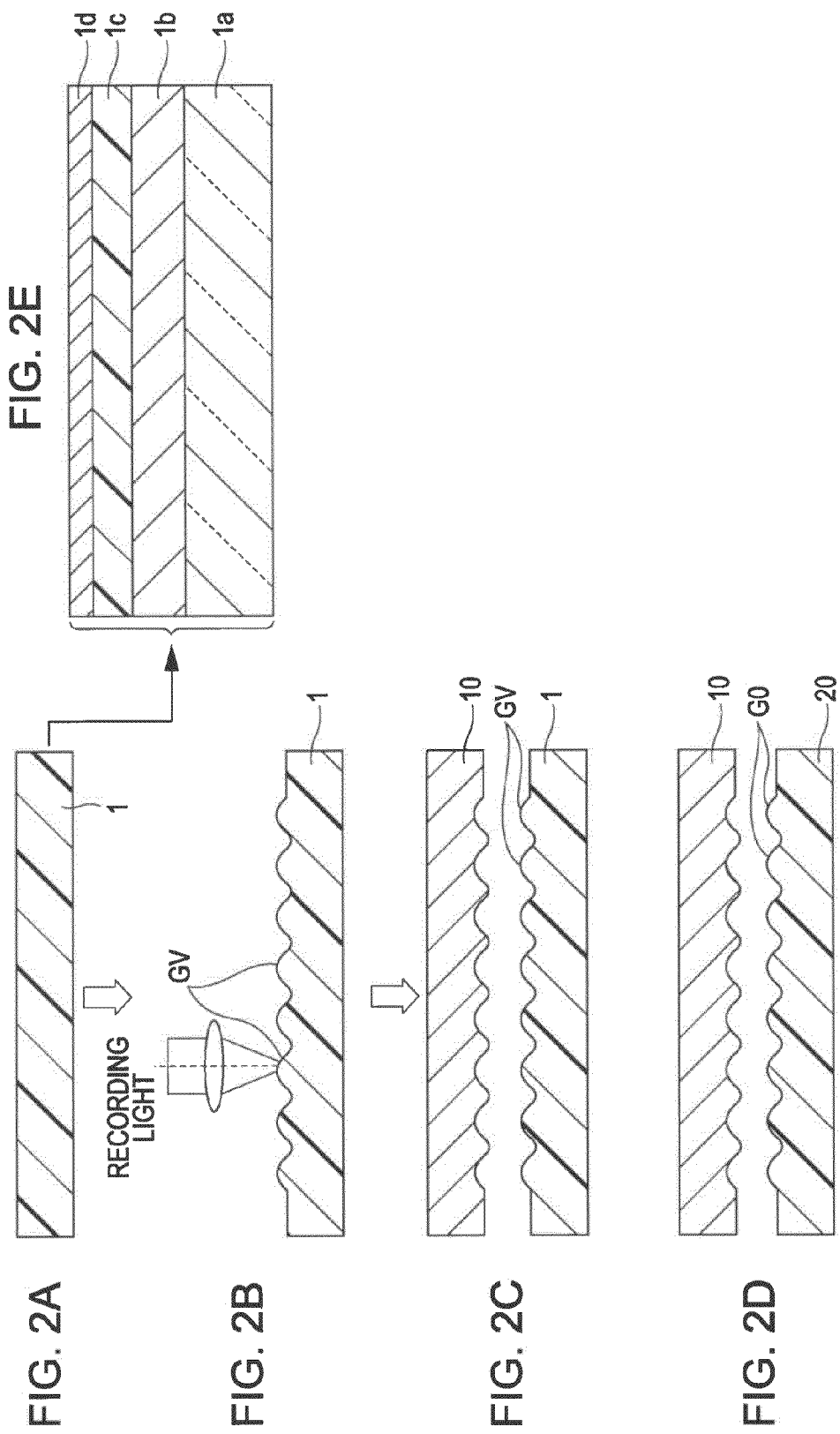

<SINGLE-LAYER DISC>

<TWO-LAYER DISC>

<FOUR-LAYER DISC>

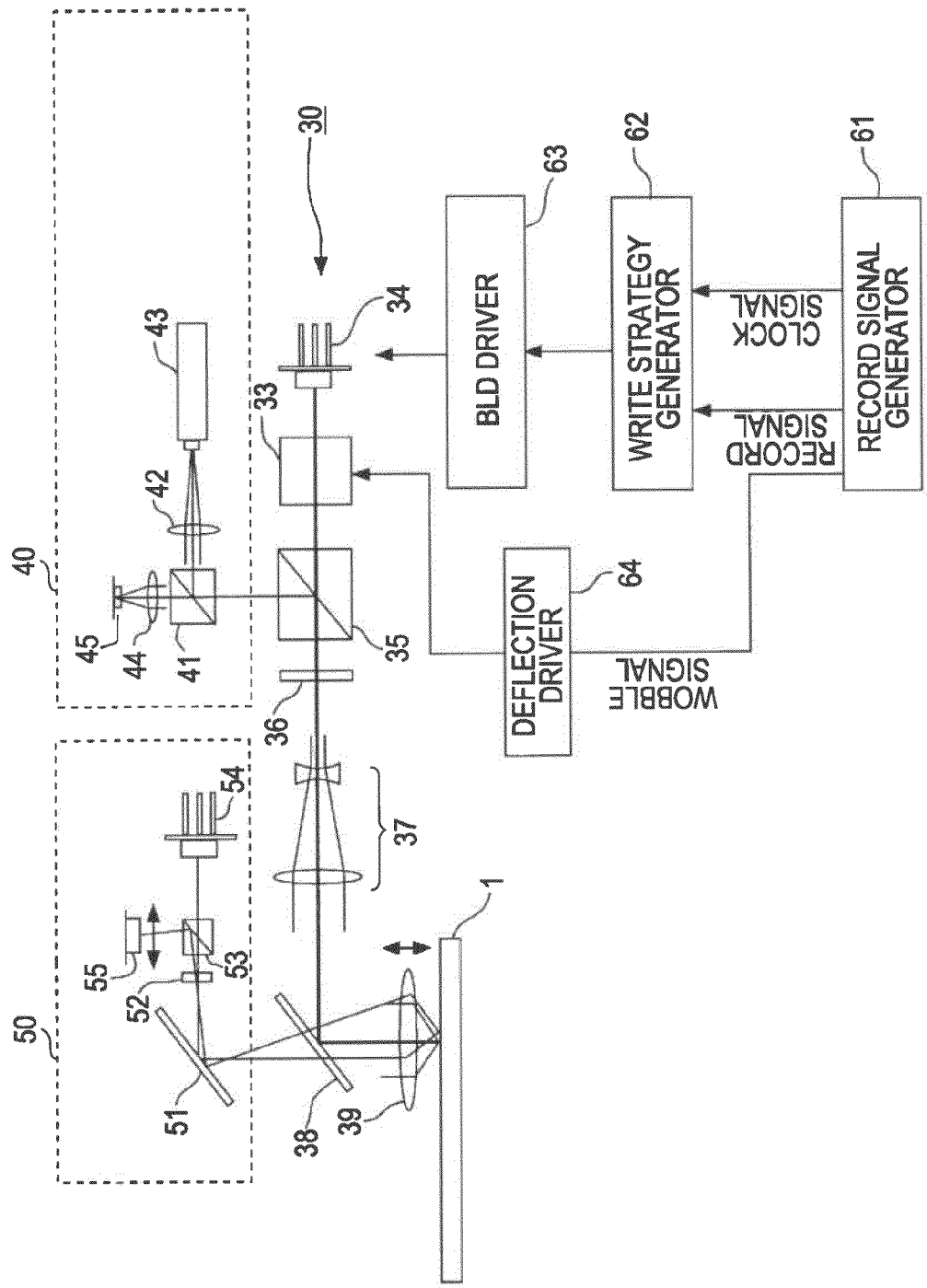

WRITE STRATEGY SIGNAL
(SHORT PULSE TRAIN)

RECORD SIGNAL

REFERENCE CLOCK SIGNAL

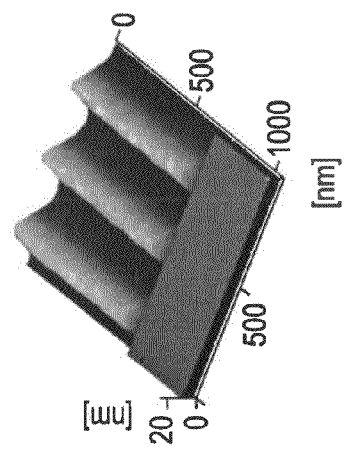
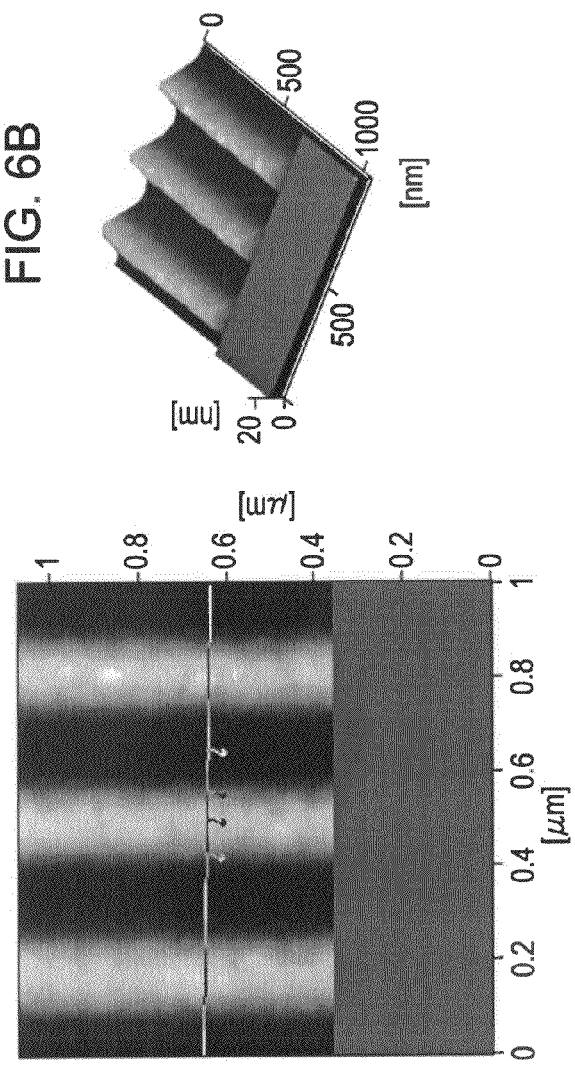
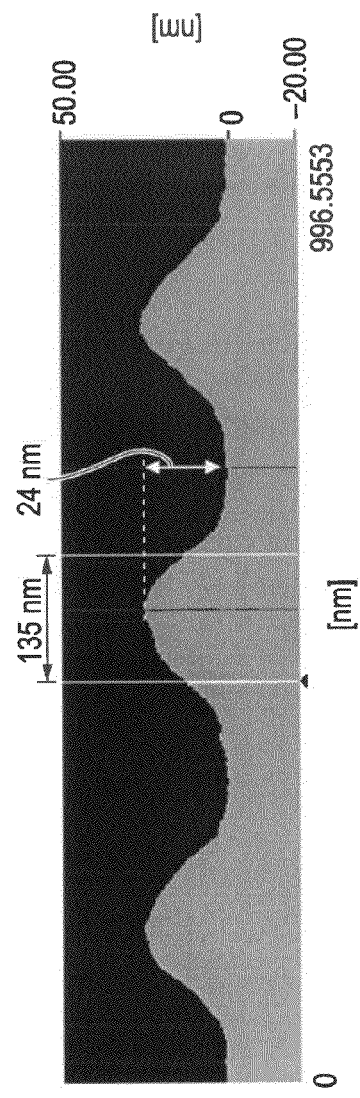

FIG. 9A

THREE TYPES OF MASTER
SAMPLES USED IN EXPERIMENT
(PARAMETER, SiN THICKNESS)

| SAMPLE NAME | a-Si HEAT STORAGE LAYER THICKNESS | INORGANIC RESIST LAYER THICKNESS | SiN SURFACE COAT LAYER THICKNESS |
|---|---|---|---|
| SAMPLE-A | 120 nm | 70 nm | 0 nm |
| SAMPLE-B | 120 nm | 70 nm | 12 nm |
| SAMPLE-C | 120 nm | 70 nm | 20 nm |

FIG. 9B

SHAPE OF GROOVE PROTRUSION
OF EACH SAMPLE AFTER EXPOSURE

| SAMPLE NAME | SiN SURFACE COAT LAYER THICKNESS | RECORDING POWER | GROOVE PROTRUSION HEIGHT | GROOVE HALF WIDTH |
|---|---|---|---|---|
| SAMPLE-A | 0 nm | 9.2 mW | 24 nm | 135 nm |
| SAMPLE-B | 12 nm | 10.8 mW | 26 nm | 180 nm |
| SAMPLE-C | 20 nm | 9.6 mW | 22 nm | 182 nm |

FIG. 10

RESULTS OF SIGNAL REPRODUCTION
OF EACH STAMPER

| SAMPLE NAME | CTS | NPP | NOISE LEVEL | | QUANTITY LEVEL OF REFLECTED LIGHT |
| --- | --- | --- | --- | --- | --- |
| | | | 3 MHz | 6 MHz | |
| SAMPLE-A MASTER | -3.0% | 0.29 | -57.2 dB | -64.5 dB | 531 mV |
| SAMPLE-B MASTER | +1.7% | 0.33 | -64.0 dB | -67.5 dB | 475 mV |
| RELATED-ART PROCESS, MOTHER | +1.2% | 0.39 | -64.2 dB | -67.4 dB | 425 mV |

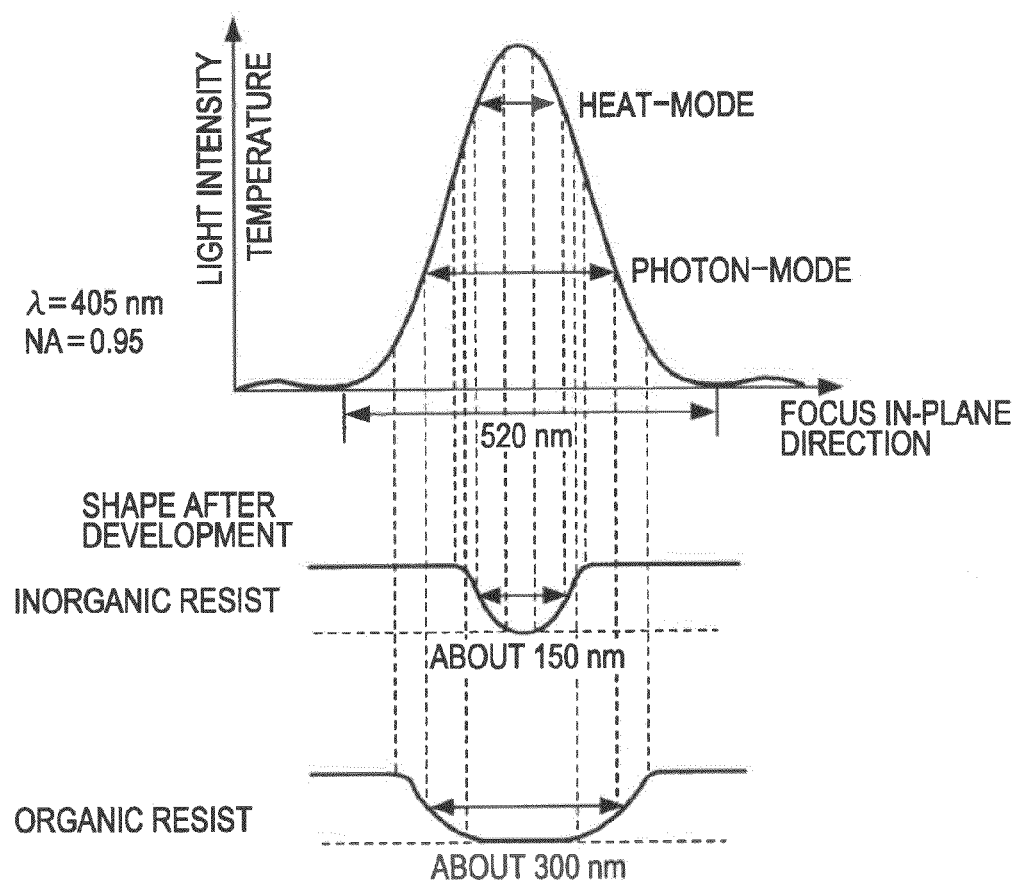

<INORGANIC RESIST LAYER DEPOSITION>

<PATTERN EXPOSURE>

<ALKALI DEVELOPMENT>

METHOD FOR MANUFACTURING DISC AND METHOD FOR MANUFACTURING STAMPER

BACKGROUND OF THE INVENTION

1. Field of the Invention

The present invention relates to a method for manufacturing a disc and a method for manufacturing a stamper using an inorganic resist master.

2. Description of the Related Art

At the start of a full-scale HD (High Definition) video age due to popularization of digital broadcasting, increases in recording density of optical discs are advanced from DVD (Digital Versatile Disc) which is the mainstream at present to Blu-ray Disc (registered trade name).

In a mastering step of optical discs, patterns such as pits and grooves are formed by lithography using laser exposure. However, the recording density has been increased mainly by contracting exposure spots.

When a laser beam at wavelength $\lambda$ is condensed by an objective lens having numerical aperture (NA) during mastering, the exposure spot diameter $\phi$ is $1.22\times(\lambda/NA)$. Since objective lenses with NA of 0.90 to 0.95 close to the theoretical limit value 1 have been used from the beginning of development of CD (Compact Disc), shortening of the wavelengths of recording laser light sources have mostly contributed to contraction of exposure spot diameters.

Although He—Cd laser at a wavelength of 422 nm or Kr+laser at a wavelength of 413 nm has been used in mastering of CD, use of Ar+laser at UV (Ultraviolet) wavelength of 351 nm has permitted manufacture of DVD. Further, DUV (Deep Ultraviolet) laser at a wavelength of 257 to 256 nm has been put into practical application, and thus recordable Blu-ray Disc (BD-RE) has been realized.

According to an approach apart from this, there has recently been technology of realizing dramatically higher-density recording by a simple process, which has been introduced into manufacture of reproduction-only Blu-ray Disc (BD-ROM). Although organic materials (photoresist) have been used for photosensitive layers during lithography, there has been found development in which with a specified inorganic material, unexposed portions are dissolved by alkali development, and resolution is significantly improved as compared with an organic resist process.

Japanese Unexamined Patent Application Publication No. 2003-315988 discloses a technique in which an inorganic material is used as a photosensitive material. Inorganic materials having a resist function are referred to as "inorganic resist" hereinafter.

FIG. 11 shows protrusion/depression shapes after exposure and development in the case in which an organic resist is used as a photosensitive material and the case in which an inorganic resist is used as a photosensitive material.

In an organic resist process, recording is performed in a photon mode, and thus the minimum exposure pattern width is proportional to the exposure spot diameter and is substantially the same value as the spot diameter half-width value.

On the other hand, in an inorganic resist process, recording is performed in a heat mode, and thus when the threshold value of reaction temperature is sufficiently increased by design of a recording film structure, only a high-temperature portion near the center of an exposure spot contributes to recording, thereby permitting significant contraction of the effective recording spot diameter.

Therefore, pits of BD-ROM cannot be precisely formed by using an organic resist even at a DUV wavelength, but hen an inorganic resist is used, sufficient resolution is achieved even by a blue semiconductor laser light source.

A semiconductor laser is capable of high-speed modulation on the GHz order and capable of precisely controlling a pit shape by introducing write strategy used for signal recording on phase-change discs and magneto-optical discs, and thus the semiconductor laser is suitable for achieving good signal characteristics. The write strategy is a method for recording one pit by high-speed multipulses. In this case, a pattern shape is optimized by controlling the pulse width, pulse strength, pulse interval, and the like of pulses.

The above-described inorganic resist process is described in brief.

As shown in FIG. 12A, an inorganic resist master 100 basically includes a layer structure in which a heat storage control layer 100b and an inorganic resist layer 100c are deposited in order by sputtering on a support (master substrate 100a) composed of, for example, a Si wafer or quartz.

In the inorganic resist master 100, as shown in FIG. 12B, a beam (recording light) modulated according to a record signal is condensed on the master surface through an objective lens with a NA of about 0.9 to perform thermal recording. The inorganic resist master 100 is installed on a turn table of an exposure apparatus and rotated at a speed corresponding to a recording linear speed to move relatively to the objective lens at a predetermine pitch (track pitch) in a radial direction.

After exposure is completed, the inorganic resist master is developed with an organic alkali developer such as tetramethylammonium halide (TMAH). As a result, protrusions/depressions corresponding to an exposure pattern are formed on the inorganic resist layer 100c. Namely, an exposed portion becomes a depressed portion corresponding to a pit shape or groove shape in the master.

SUMMARY OF THE INVENTION

The process for manufacturing a reproduction-only emboss pit disc (BD-ROM) known as Blu-ray disc and the process for manufacturing a recordable disc (BD-R, BD-RE) are described with reference to FIGS. 13A to 13I to 15A to 15J.

FIGS. 13A to 13I show the process for manufacturing BD-ROM.

An inorganic resist master 100 (FIG. 13A) is irradiated with a laser beam modulated according to recording information to perform exposure according to a pit pattern (FIG. 13B). Then, development is performed as described with reference to FIGS. 12C to form the inorganic resist master 100 having depressed portions as pit portions (FIG. 13C).

Then, the protrusions/depressions pattern of the inorganic resist master 100 is transferred to form a master stamper 110 (FIGS. 13D and E). In the master stamper 110, pit-corresponding portions are protrusions.

Then, a disk substrate (plastic substrate) 120 is molded by injection molding using the master stamper 110 (FIGS. 13F and 13G). The disc substrate 120 has depressed portions as pit portions.

An antireflective film is deposited on the protrusions/depressions surface of the disc substrate 120 to form a recording layer L0 (FIG. 13H). Further, a light-transmitting layer (cover layer) 121 is formed on the recording layer L0 (FIG. 13I).

As a result, an optical disc is completed. In the optical disc, the light-transmitting layer side serves as a plane of incidence of record/reproduction laser. Therefore, an emboss pit pattern of the recording layer L0 has pit portions projecting toward the incidence plane side.

On the other hand, in the recordable disc, a groove, not a pit train, is formed as a recording track. However, with respect to the protrusions/depressions direction of a groove/land pattern, a Blu-ray disk format has specific rules.

In a Blu-ray disc, a light-transmitting layer 121 of 100 μm is formed on a protrusions/depressions transfer surface (recording layer L0) of the disc substrate 120. Although recording/reproduction beam is applied from the light-transmitting layer side as shown in FIG. 14, groove G used for signal recording/reproduction is disposed on the front side, and land L is disposed on the rear side as viewed from the light-transmitting layer side.

This is based on the optical reason that when recording/reproduction light is condensed by an objective lens with high NA as in a Blu-ray disc, good signal characteristics are obtained using the front side of the groove because the light little enters the rear side of the groove.

Therefore, the process for manufacturing a recordable disc is different from that shown in FIGS. 13A to 13I but is as shown in FIGS. 15A to 15I.

FIGS. 15A to 15I show the process for manufacturing BD-R or BD-RE.

An inorganic resist master 100 (FIG. 15A) is irradiated with a laser beam to perform exposure (FIG. 15B). In this case, the laser beam is deflected according to wobbling which indicates information to be recorded in the groove, thereby forming an exposure pattern as a wobbling groove. Then, development is performed as described with reference to FIG. 12C to form the inorganic resist master 100 having depressions as groove portions (FIG. 15C).

Since positive resist (type in which an exposed portion is soluble in an alkali) is used, the groove after development is disposed on the rear side (depression) of the master. During exposure of the master, the groove is recorded by a recording spot wobbled by a deflector, and thus the unexposed side cannot be used as the groove.

Next, the protrusions-depressions of the inorganic resist master 100 are transferred to form a master stamper 110 (FIG. 15D). However, in the master stamper 110, portions corresponding to the groove are protrusions. Therefore, when a disc substrate 120 is formed using the master stamper 110, the groove of the disc substrate 120 corresponds to depressions toward the incidence plane side.

Therefore, the protrusions-depressions of the master stamper 110 are inverted to form a mother stamper 111 (FIG. 15E).

Then, the disc substrate (plastic substrate) 120 is formed by injection molding using the mother stamper 111 (FIGS. 15F, G). In the disc substrate 120, groove G corresponds to protrusions, and land L corresponds to depressions.

A recording layer L0 containing a recording material such as a phase change material, a dye change material, or the like is formed on the protrusions/depressions surface of the disc substrate 120 (FIG. 15H). Further, a light-transmitting layer (cover layer) 121 is formed on the recording layer L0 (FIG. 15I).

Consequently, a recordable optical disc is completed. In the optical disc, the light-transmitting layer side is the incidence plane for recording/reproduction laser, and thus the groove in the recording layer L0 protrudes toward the incidence surface side.

Therefore, in the process for manufacturing the recordable disc, according to the definitions of protrusions/depressions of the land/groove pattern, the step of transferring from the master stamper 110 to the mother stamper 111 is indispensable. Therefore, when transfer is performed between the stampers, the stampers are separated from each other at the interface after electroplating, and thus releasing treatment is previously carried out for the stamper surface as a transfer source. Examples of the treatment method include a method of immersing in an acid chemical such as an aqueous potassium permanganate solution, a dichromic acid solution, or the like, and a method of forming an oxide film on a nickel surface by ultraviolet irradiation in an oxygen atmosphere (refer to Japanese Unexamined Patent Application Publication No. 2003-217189).

However, such a releasing treatment is difficult to control, causing a decrease in yield. If the releasing treatment is insufficient, in the worst case, separation failure occurs. Even when the stampers can be separated, the surfaces are scratched or defects partially occurs in a pattern. When the treatment is excessive, the stampers are partially naturally separated by the stress applied during plating growth, and a plating solution enters, thereby leaving stains on the stampers even after washing after release.

The disc substrate 120 molded using the mother stamper 111 has a higher error rate and a high rate of defective products. There is also a failure case in which bubbles on the micron diameter order, which are produced in chemical reaction of the plating solution, are transferred to the whole surface of the mother stamper 111. Since the conditions of the plating solution and the chemical used in the releasing treatment change with time, the stable conditions cannot be easily maintained over a long time.

Accordingly, it is desirable to resolve the problems due to the releasing treatment and realize improvement in efficient over the whole process for manufacturing a disc.

A method for manufacturing a disc according to an embodiment of the present invention includes the steps of performing laser exposure of an inorganic resist master on which a photosensitive layer is formed using an inorganic material, which protrudes in an exposed region, and a surface coat layer is formed on the surface of the photosensitive layer in order to control the shape of protrusions, transferring the shape of protrusions formed by the laser exposure on the inorganic resist master to produce a stamper in which portions corresponding to the shape of protrusions are depressions, forming a resin substrate using the stamper so that portions corresponding to the shape of protrusion are protrusions, and forming a predetermined layer structure on the resin substrate tot produce an optical disc.

The surface coat layer is formed using SiN.

The laser exposure is performed to form a groove pattern corresponding to a recording track on an optical disc produced by the disc production step.

The stamper is a metal stamper.

The shape of protrusions formed in a laser exposed portion of the inorganic resist master has a substantially sine-wave sectional shape.

A method for manufacturing a stamper according to an embodiment of the present invention includes the steps of performing laser exposure of an inorganic resist master on which a photosensitive layer is formed using an inorganic material, which protrudes in an exposed region, and a surface coat layer is formed on the surface of the photosensitive layer in order to control the shape of protrusions, and transferring the shape of protrusions formed by the laser exposure on the inorganic resist master to produce a stamper in which portions corresponding to the shape of protrusions are depressions.

For example, when a stamper for manufacturing BD-R and BD-RE is manufactured, an inorganic material is used as a resist for master lithography. In addition, a development step, and a step of inversion from the master stamper to the mother stamper are omitted by utilizing the characteristics of the inorganic resist master, thereby improving tact time and yield of the manufacture.

That is, in the inorganic resist master, an exposed portion protrudes, and the stamper is formed directly using the protrusion so that in the stamper formed from the master, an exposed portion (for example, a groove portion) becomes a depressed portion.

In addition, since the protrusion is transferred to the depression of the stamper and the protruding groove of the disc substrate, it is necessary to appropriately control the shape of protrusions. Therefore, in order to control the groove to a desired shape or suppress deterioration of surface roughness of the groove, a thin-film surface coat layer is formed on the surface of the inorganic resist layer of the inorganic resist master.

Since the surface coat layer composed of SiN or the like has the function to suppress protrusion of the inorganic resist, when the film thickness is properly set, the height and width of the protruding groove can be optimized. Further, surface roughening of the protrusion is also suppressed.

According to the present invention, in a manufacturing process in which an exposed portion in a master stage becomes a protrusion (for example, a protruding groove) toward the incidence surface side in the stage of a disc product, the step of forming a mother stamper from a master stamper to invert protrusions and depressions of the exposed portions is not required.

Further, the development step after exposure of the master is not required.

Therefore, the development step and the electroplating step for transfer from the master stamper to the mother stamper, which exhibit a high rate of occurrence of defects, can be omitted, thereby improving the yield of manufacture and realizing significant shortening (for example, about 2 to 3 hours) of the process.

Further, in order to control a protrusion of an exposed portion of the master to a desired shape, the surface coat layer composed of SiN or the like is formed on the inorganic resist.

Therefore, a groove shape having desired width and height can be formed, and the noise characteristics of an optical disc are improved, thereby manufacturing an optical disc of high quality.

BRIEF DESCRIPTION OF THE DRAWINGS

FIGS. 1A and 1B flowcharts of a manufacturing process according to an embodiment of the present invention and a related-art manufacturing process, respectively;

FIGS. 2A to 2E are drawings illustrating manufacturing steps according to an embodiment of the present invention;

FIG. 4 is a drawing illustrating a master exposure apparatus used in an embodiment of the present invention;

FIGS. 6A to 6C are drawings showing AFM observation images of a master as Sample A;

FIGS. 9A and 9B are drawings illustrating the thickness and protrusion shape of each sample;

FIG. 10 is a drawing illustrating results of signal reproduction of each sample;

FIG. 11 is a drawing illustrating the high resolution power of inorganic resist;

DESCRIPTION OF THE PREFERRED EMBODIMENTS

An embodiment of the present invention is described in the following order:
1. Manufacturing process according to an embodiment
2. Master production step
3. Stamper production step
4. Disc production step
5. Examples
6. Summary 1. Manufacturing Process According to an Embodiment In this embodiment, the present invention is applied to a process for manufacturing a recordable Blu-ray disc (BD-R, BD-RE).

In the manufacturing process, when a stamper is produced, an inorganic material is used as a resist (photosensitive layer) for master lithography, and a development step and a step for inverting protrusions and depressions from a master stamper to a mother stamper are omitted, thereby improving the tact time and the yield of manufacture. Further, an optical disc of high signal quality is manufactured.

BD-R (Blu-ray Disc Recordable) is a write-once disc based on the Blue-ray disc standard. BD-RE (Blu-ray Disc Rewritable) is a rewritable disc based on the Blue-ray disc standard.

Disc substrates of BD-R and BD-RE have substantially the same structure.

Only a groove is previously formed on a disc substrate, but a pit train is not formed. The track pitch of the groove is 320 nm in almost all regions such as a data recording region, excluding 350 nm in a PIC (Permanent Information & Control Date) region in the innermost periphery, and the groove has a single spiral structure.

In addition, the depth of the groove is about 25 nm.

Unique information such as an address and the like is recorded in the groove in a wobbling system.

In the specification, the names of protrusions and depressions of the groove structure are wobbling, and the side used for signal recording/reproduction is referred to as the "groove", and the side not used in signal recording is referred to as a "land".

Figure 14:
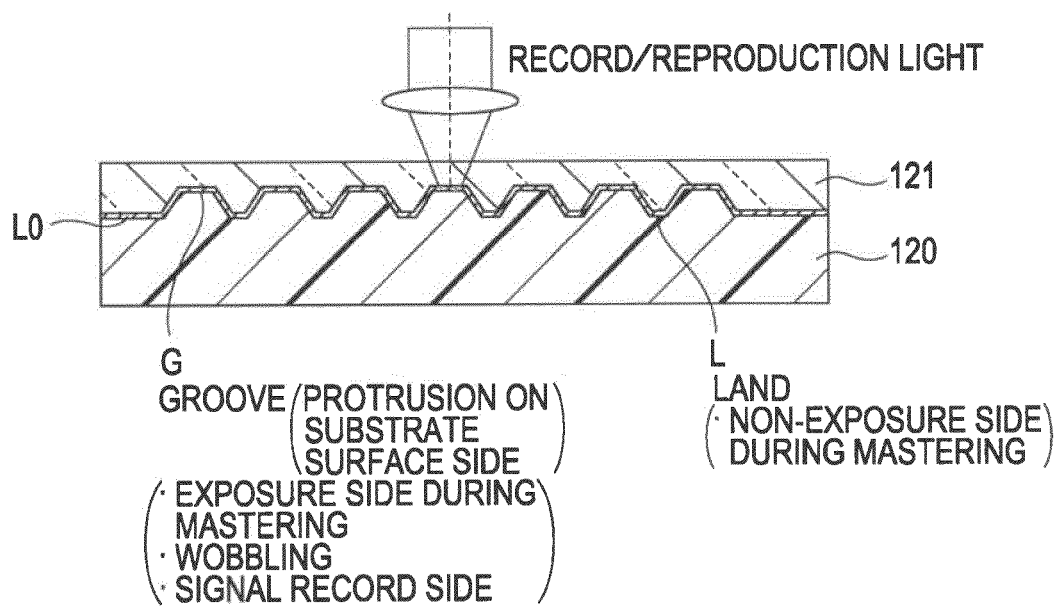
FIG. 14 is a drawing illustrating the protrusion/depression definitions of a groove.

As described above with reference to FIG. 14, with respect to the directions of protrusions and depressions on the groove/land disc substrate, groove G used in recording/reproduction is disposed on the front side, and the land is disposed on the rear side as viewed from the light-transmitting layer side according to the Blu-ray disc format.

The process for manufacturing BD-R and BD-RE discs is shown in FIGS. 1A and 1B.

FIG. 1A shows the manufacturing process according to the embodiment. For comparison, FIG. 1B shows a related-art manufacturing process.

Although each of the steps is described in detail below, the manufacturing process of the embodiment is schematically as follows:

First, a master deposition step (ST1) is performed. In this step, a heat storage control layer, an inorganic resist layer, and a surface coat layer are formed on a master substrate to form an inorganic resist master.

Then, a cutting step (ST2) is performed. Namely, exposure of the inorganic resist master is performed to form a groove pattern.

The master production step is described above. In the embodiment, development is not performed for the inorganic resist master subjected to exposure.

Then, in the stamper production step, a metal film such as an inorganic resist is formed by sputtering in a surface conducting step (ST3).

In addition, a master stamper electroplating step (ST4) is performed to form a master stamper.

Then, in the disc production step, a disc substrate (plastic substrate) is molded by injection molding using the master stamper (molding step (ST5)).

Then, in the layer structure forming step (ST6), a layer structure including a recording layer, a light-transmitting layer, and the like is formed to complete an optical disc.

Figure 15A:
FIGS. 15A to 15J are drawings illustrating a related-art process for manufacturing a recordable disc.
Figure 15F:
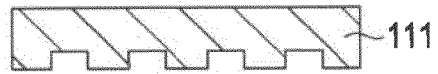
Figure 15B:
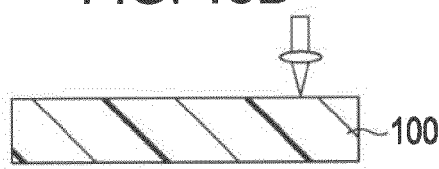
Figure 15G:
Figure 15C:
Figure 15H:
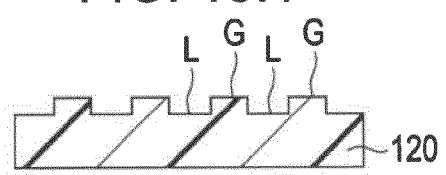

FIG. 1B is a flowchart showing the steps of the related-art manufacturing process described with reference to FIGS. 15A o 15J. The steps are as follows:

In the master production step, a master deposition step (ST10), a cutting step (ST11), and an alkali development step (ST12) are performed. These steps correspond to the steps described with reference to FIGS. 15A to 15C, respectively.

In the stamper production step, a master stamper electroplating step (ST13), a master stamper releasing step (ST14), and a master stamper-mother stamper transfer step (electroplating step) (ST15) are performed. These steps correspond to the steps described with reference to FIGS. 15D to 15F, respectively. In the master stamper releasing step (ST14), ultraviolet irradiation or immersion in an aqueous potassium permanganate solution is performed.

In the disc production step, a disc substrate molding step using the mother stamper (ST16) and a layer structure forming step (ST17) are carried out. These steps correspond to the steps described with reference to FIGS. 15G to 15J, respectively.

The manufacturing process of the embodiment is different from the related-art manufacturing process in the following points:

In the embodiment, in the master deposition step, the surface coat layer is formed on the surface of the inorganic resist layer serving as a photosensitive layer.

In the embodiment, the alkali development step is not performed.

In the embodiment, the mother stamper is not produced, and thus the master stamper releasing step and the stamper transfer step are not performed.

Hereinafter, each of the steps is described in detail.

2. Master Production Step

First, in the master deposition step (ST1) shown in FIG. 1A, an inorganic resist master 1 shown in FIGS. 2A and E is formed.

Although an inorganic resist master usually has a structure in which a heat storage control layer and an inorganic resist are deposited in order by sputtering on a support composed of, for example, a Si wafer or quartz, the inorganic resist master of the embodiment has a structure shown in FIG. 2E.

That is, a heat storage control layer 1b, an inorganic resist layer 1c, and a surface coat layer 1d are deposited by sputtering on a master substrate 1a composed of a Si wafer or quartz.

The heat storage control layer 1b is used for heating the inorganic resist without escaping the heat applied by an exposure spot to the master substrate 1a. Therefore, an increase in thickness causes an increase in resist sensitivity, but an excessively high heat storage effect degrades resolution due to excessive heat diffusion in the planar direction. Therefore, it is important to select a material and thickness so as to balance the resist sensitivity and resolution. In fact, amorphous silicon (a-Si), $SiO_2$, or SiN is deposited to a thickness of about 20 to 100 nm.

As an inorganic resist material for the inorganic resist layer 1c, $SiO_2$ and a chalcogenide-based material have been reported. However, the inorganic resist material preferably has practical sensitivity to blue to ultraviolet ray wavelengths. Therefore, incomplete oxides of transition metals, such as W (tungsten), Mo (molybdenum), and the like, may be used. Other examples of a transition metal constituting the resist material include Ti, V, Cr, Mn, Fe, Nb, Cu, Ni, Co, Ta, Zr, Ru, Ag, and the like.

The surface coat layer 1d is formed for controlling the shape of protrusions formed in the inorganic resist layer 1c by exposure.

In the inorganic resist master 1, in a laser-exposed region, the inorganic resist film is phase-changed from an amorphous state to a crystal state, causing cubical expansion. As a result, an exposed portion protrudes by 20 to 30 nm. In this embodiment, by applying this phenomenon, a protruding portion is used as a protrusion pattern (groove).

Therefore, in the embodiment, the surface coat layer 1d is formed for obtaining a proper protrusion shape.

For example, a SiN film is deposited to a thickness of about 10 nm to 20 nm on the surface of the inorganic resist. Since the SiN film is very hard, protrusion of the inorganic resist is suppressed, and thus the same degree of protrusion can be achieved by exposure with higher recording power. As a result, at a point where the protrusion height reaches 25 nm, a groove wider than an usual groove is formed.

By using this effect, the width and height of the groove can be optimized by appropriately controlling the thickness of the SiN surface film. In addition, protrusions of the inorganic resist are polycrystalline, thereby roughening the surface. However, when a dense SiN film is used as the surface coat film, the surface roughness of the protruding groove is improved, causing the effect of realizing lower noise.

Then, in the cutting step (ST2), laser exposure for the groove pattern is performed on the inorganic resist master 1 formed as described above.

FIG. 4 shows an inorganic resist exposure apparatus.

An exposure optical system 30 includes a laser light source (blue semiconductor laser) 34, a deflection element 33, a polarizing beam splitter (PBS) 35, a ¼ wavelength plate 36, a beam expander 37, a dichroic mirror 38, and an objective lens 39. As the deflection element 33, for example, an AOD (acoustooptic deflector), an EOD (electrooptic deflector), or the like is used.

In the exposure optical system 30, a blue semiconductor laser at a wavelength of about 405 nm is used as the laser light source 34, and a beam modulated according to a recording signal is condensed on the inorganic resist master 1 through the objective lens 39 having a NA of about 0.9 to perform thermal recording (refer to FIG. 11).

The blue laser beam output from the laser light source 34 passes through the deflection element 33, the polarizing beam splitter 35, the ¼ wavelength plate 36, and the beam expander 37, is led to the objective lens 39 by the dichroic mirror 38, and is condensed on the inorganic resist master 1.

The inorganic resist master 1 is installed on a turn table (not shown), rotated at a speed corresponding to a recording linear speed, and is moved relatively to the objective lens 39 at a predetermined feed pitch (track pitch) in the radial direction.

The laser beam (return light) reflected by the inorganic resist master 1 is reflected by the dichroic mirror 38, passes through the beam expander 37 and the ¼ wavelength plate 36, and reaches the polarizing beam splitter 35. Since the return light passes through the ¼ wavelength plate 36 two times, the light is reflected by the polarizing beam splitter 35 and led to a return light optical system 40.

In the return light optical system 40, the return light is separated by a beam splitter 41. A part of the separated return light is incident on a CCD camera through a lens 42 and used for observing the shape of a condensed spot, and another part is condensed on a photodetector (PD) 45 for monitoring the quantity of reflected light through a lens 44.

As described above, at the moment of exposure of the inorganic resist master 1, an exposed region protrudes and the reflectance changes. Therefore, when an exposed region is traced with DC light after pattern recording, a reproduction signal is observed on the photodetector 45.

The resist sensitivity is confirmed using the reproduced waveform before real exposure so that recording can be always performed with optimum power even when the sensitivity slightly changes according to the master used.

A focusing system is an example of an off-axis method using a focusing red laser like in a usual optical disc exposure apparatus.

The off-axis method is a system utilizing the phenomenon that when focus light is shifted in parallel from the optical axis of the objective lens 39 and is incident, the direction of light reflected from the surface of the inorganic resist master 1 changes depending on the distance between the inorganic resist master 1 and the objective lens 39.

The focusing light output from a red laser diode 54 passes through a polarizing beam splitter 53 and a ¼ wavelength plate 52, changes in optical path by a mirror 51, passes through the dichroic mirror 38, and reaches the objective lens 39. Then, the light shifted in parallel from the optical axis of the objective lens 39 is applied to the inorganic resist master 1.

Return light reflected from the inorganic resist master 1 is transmitted through the dichroic mirror 38, is reflected by the mirror 51, and reaches the polarizing beam splitter 53 through the ¼ wavelength plate 52. Then, the light is reflected by the polarizing beam splitter 53 and led to a position sensor diode (PSD) 55.

The position of the return light of the focusing light is detected by the position sensor diode 55, and servo control is applied to an actuator (not shown) of the objective lens 39 so that the position is maintained constant (the distance between the master and the lens is maintained constant). As a result, the objective lens 39 is driven in the optical axis direction to perform focus control.

In the inorganic resist master 1, even when the master is irradiated with recording light, no phenomenon occurs with intensity at the reaction threshold temperature or less. Therefore, the master may be constantly irradiated with the recording light. Thus, focusing can be easily made by the recording light. In this case, like in a recording/reproduction apparatus for discs, an astigmatism method or knife edge method may be used.

A recording signal for forming an exposure pattern is described.

In a ROM disc cutting step in which a pit train is exposed, the deflection element 33 is not required, and ON/OFF modulation operation is performed by the laser light source 34.

This case is described.

A recording signal converted by a modulation system usually used for optical discs, for example, 8-14 modulation, 8-16 modulation, or RLL(1-7) modulation, is output from a recording signal generator 61 which includes contents to be recorded.

The signal becomes Hi-Level according to pit length nT (n=2, 3, 4, . . . ) or Low-Level according to land length mT (m=2, 3, 4, . . . ), and may be input to a modulator as it is.

When a write strategy is introduced by a semiconductor laser light source, a write strategy generator 62 is required as a converter which converts the recording signal to multi-pulses.

In addition to the recording signal, the recording signal generator 61 outputs a clock signal as a time reference to the strategy generator circuit.

The write strategy generator 62 decomposes a pulse of a pit portion into a plurality of short pulses according to a predetermined parameter set by an user to provide a peak strength and distance.

Figure 5A:
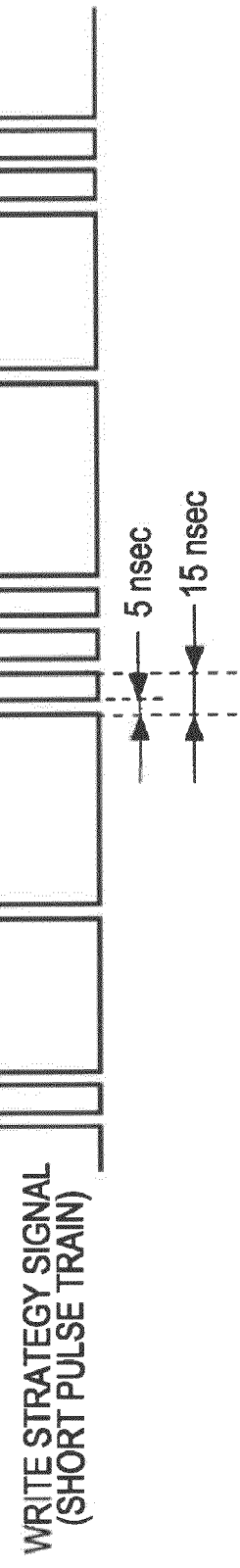
FIGS. 5A to 5C are drawings illustrating laser modulation by a write strategy signal.

FIG. 5A shows an example in which a pulse of nT (T is the channel clock period) is recorded by (n−1) short pulses.

Figure 5B:
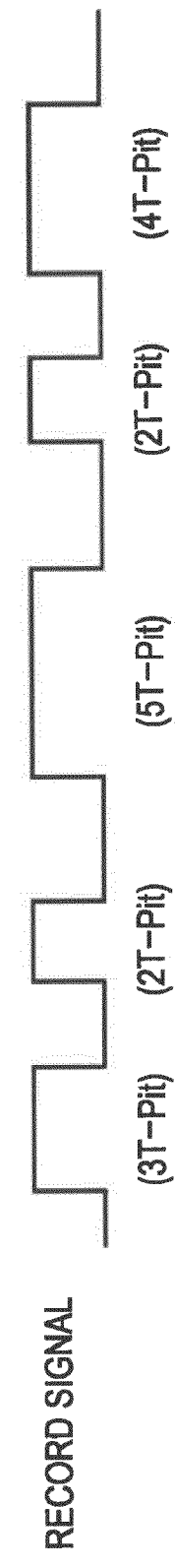
Figure 5C:
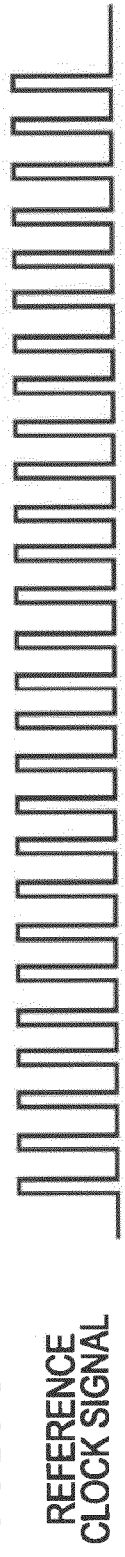

FIGS. 5B and 5C show the recording signal and the clock signal, respectively, which are output from the recording signal generator 61. The write strategy generator 62 converts the recording signal to a write strategy signal including a short pulse train shown in FIG. 5A. The short pulse train is arrayed on a time axis based on the clock signal and input to a laser driver 63. The laser driver 63 performs ON/OFF modulation operation of the laser light source 34 (semiconductor laser) according to the write strategy signal.

As a result, the recording laser light becomes modulated light according to the pit train, thereby forming an exposure pattern corresponding to the pit train on the inorganic resist master 1.

On the other hand, in the process for manufacturing BD-R and BD-RE, groove pattern exposure is performed.

In this case, the laser driver 63 executes an operation of emitting continuous light (DC emission) without ON/OFF modulation of the laser light source 34. Alternatively, emission of high-speed pulses at a single period may be executed.

The recording signal generator 61 outputs information (wobbling signal) to be recorded as a wobbling groove.

The wobbling signal is supplied to a deflection driver 64. The deflection driver 64 drives the deflection element 33 so that wobbling is formed as an exposure pattern according to the wobbling signal.

As a result, the recording laser light is deflected according to the wobbling signal, and in the inorganic resist master 1, exposure of a groove pattern wobbled based on information to be recorded is performed.

For example, exposure of the inorganic resist master 1 is performed using the above-described master exposure apparatus.

As described above, in an exposed region of the inorganic resist master 1, the inorganic resist film is phase-changed from an amorphous state to a crystalline state to cause cubical expansion.

FIG. 2B schematically shows the state of laser exposure.

As shown in FIG. 2B, an exposed portion becomes a protrusion having a substantially sine-wave sectional shape due to protrusion by laser exposure. This portion corresponds to groove GV on the inorganic resist master 1. An unexposed portion becomes a depression corresponding to land.

In this embodiment, in this state, the master production step is completed. Namely, alkali development is not performed.

3. Stamper Production Step

Then, in the stamper production step, the surface conducting step (ST3) is first performed. In this step, a conduction metal film is formed by sputtering on the surface (i.e., the surface coat layer 1*d*) of the inorganic resist master 1 after the cutting step (ST2). For example, an inorganic resist is used.

Then, in the master stamper electroplating step (ST4), a metal stamper (e.g., a nickel stamper) is formed.

FIG. 2C shows a master stamper 10 to be formed.

A metal layer formed by electroplating the inorganic resist master 1 is separated from the inorganic resist master 1 to form the master stamper 10.

As described above, in the inorganic resist master 1, protrusions/depressions with a substantially sine-wave sectional shape are produced by protrusion of exposed portions. The protrusions correspond to groove GV. Therefore, in the master pattern 10 to which the shape of protrusions/depressions is transferred, protrusions/depressions with a substantially sine-wave sectional shape are produced, and the depressions correspond to the groove.

Figure 15D:
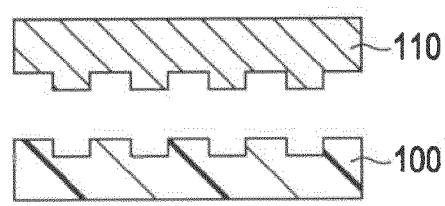
Figure 15I:
Figure 15E:
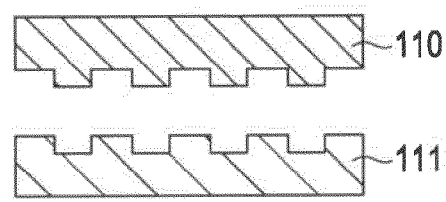
Figure 15J:
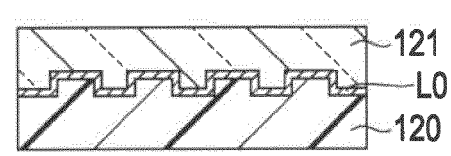

In the related-art manufacturing process shown in FIG. 1B, as shown in FIG. 15D, the master stamper 110 in which groove-corresponding portions are protrusions is formed. Therefore, the mother stamper 111 in which groove-corresponding portions are depressions is further formed.

In the embodiment, in the master stamper 10 shown in FIG. 2C, groove-corresponding portions are depressions, and thus the mother stamper 111 is not formed. That is, the next disc production step may be performed using the master stamper 10.

4. Disc Production Step

In the disc production step, first, the disc substrate molding step (ST5) is carried out using the master stamper 10.

For example, the master stamper 10 is placed in a mold, and a disc substrate (plastic substrate) 20 shown in FIG. 2D is formed by injection molding of a resin such as polycarbonate or the like.

Since, in the master stamper 10, groove portions are depressions, in the disc substrate 20, groove G0 corresponds to protrusions, and land corresponds to depressions.

The layer structure forming step (ST6) is performed for the protrusions/depressions surface of the disc substrate 20.

Figure 3A:
FIGS. 3A to 3F are drawings illustrating manufacturing steps according to an embodiment of the present invention.

As shown in FIG. 3A, the recording layer L0 including a recording material layer of a phase change material, a dye change material, or the like, a dielectric layer, and the like is formed on the surface formed in a groove/land shape.

Figure 3B:
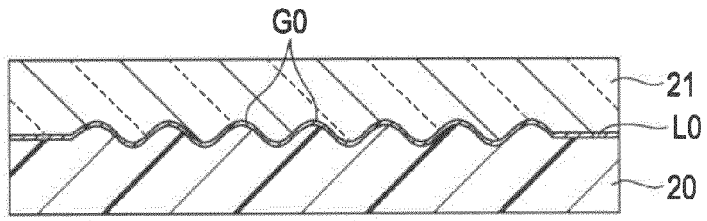

Further, as shown in FIG. 3B, a light-transmitting layer (cover layer) 21 is formed on the recording layer L0. For example, the light-transmitting layer 21 is formed by spin coating and ultraviolet irradiation curing of ultraviolet curable resin. As a result, a recordable optical disc as a single-layer disc including the recording layer L0, such as BD-R or BD-RE, is completed.

In the resultant optical disc, the light-transmitting layer side is the incidence plane for recording/reproduction laser, and thus, the groove G0 of the recording layer L0 protrudes toward the incidence plane side.

Although FIGS. 3A and 3B schematically show the disc, actually the thickness of the disc substrate 20 is about 1.1 mm, and the thickness of the light-transmitting layer 21 is about 100 μm.

In addition, a hard coat layer may be formed on the surface of the light-transmitting layer 21.

Figure 3C:
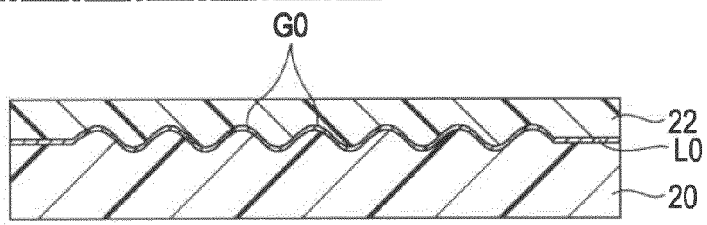
Figure 3D:
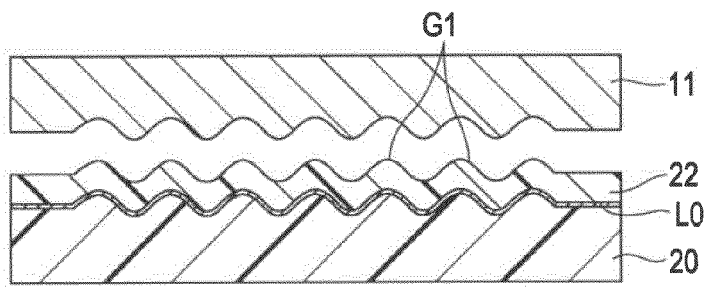
Figure 3E:
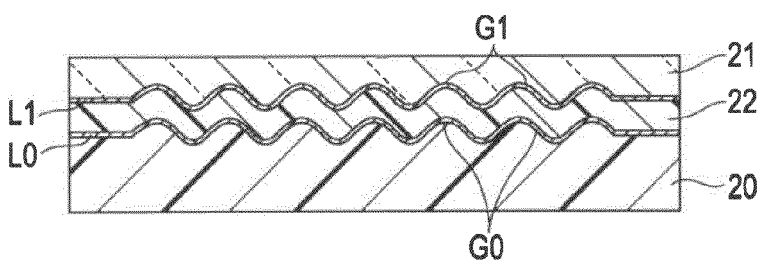

In the case of a two-layer disc having two recording layers L0 and L1, steps shown in FIGS. 3C, 3D, and 3E are performed.

The same steps as those until FIG. 3A for the single-layer disc are performed. After the recording layer L0 is formed, a material (ultraviolet curable resin) for a spacer layer 22 is spread by spin coating. Then, a groove pattern is transferred to the spacer layer 22 using a master stamper 11 (metal stamper) for the recording layer L1, which is formed through the same steps as those shown in FIGS. 2A to 2C.

In this case, the master stamper 11 is pressed on the uncured ultraviolet curable resin (spacer layer 22) and irradiated with ultraviolet light from the lower side of the drawing (disc substrate 20 side).

Then, the master stamper 11 is separated to transfer the shape of groove G1 as the recording layer L1 as shown in FIG. 3B.

Then, the recording layer L1 including a recording material layer of a phase change material, a dye change material, or the like, a dielectric layer, and the like is formed on the surface formed in a groove/land shape. Further, a light-transmitting layer 21 is formed on the recording layer L1 complete the two-layer disc having the recording layers L0 and L1.

In the two-layer optical disc, the groove G0 of the recording layer L0 and the groove G1 of the recording layer L1 protrude toward the incidence plane side.

Figure 3F:
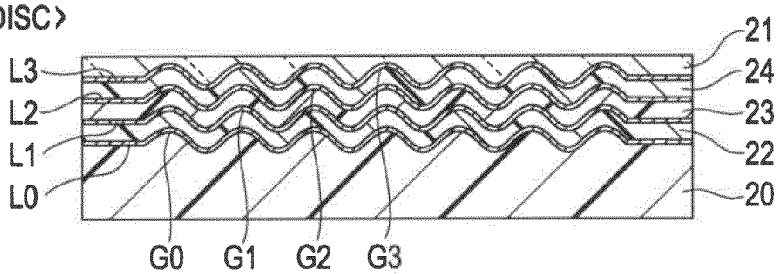

FIG. 3F shows a four-layer disc including recording layers L0, L1, L2, and L3.

In this case, the step for the recording layer L1 of the two-layer disc is repeated.

That is, after the recording layer L0 is formed as shown in FIG. 3A, a spacer layer 22 is formed, and a groove pattern is transferred to the spacer layer 22 using a master stamper 11 for the recording layer L1. Then, the recording layer L1 is formed on the surface to which the groove pattern is transferred.

Then, after the recording layer L1 is formed, a spacer layer 23 is formed, and a groove pattern is transferred to the spacer layer 23 using a master stamper (not shown) for the recording layer L2. Then, the recording layer L2 is formed on the surface to which the groove pattern is transferred.

Further, after the recording layer L2 is formed, a spacer layer 24 is formed, and a groove pattern is transferred to the spacer layer 24 using a master stamper (not shown) for the recording layer L3. Then, the recording layer L3 is formed on the surface to which the groove pattern is transferred.

Further, a light-transmitting layer 21 is formed on the recording layer L3 to complete the four-layer disc having the recording layers L0, L1, L2, and L3.

In this case, four master stampers are formed corresponding to the respective recording layers L0 to L3. However, any one of the master stampers is formed through the steps shown in FIGS. 2A to 2C.

Therefore, in the four-layer optical disc, the groove G0 of the recording layer L0, the groove G1 of the recording layer L1, the groove G2 of the recording layer L2, and the groove G3 of the recording layer L3 protrude toward the incidence plane side.

5. Examples

In the optical disc manufacturing process of the embodiment described above, the master stamper 10 is formed, without development, under the condition in which exposed regions protrude by about 25 nm immediately after exposure of the groove pattern on the inorganic resist master 1, and the substrate is formed using the master stamper 10.

As described with reference to FIGS. 15A to 15J, when development is performed according to the usual process, the groove corresponds to depressions on the inorganic resist master. However, in the embodiment, depressions are inverted to protrusions on the inorganic resist master, and thus the master stamper 10 may be used for injection molding.

With respect to the shape of the protruding groove, in order to satisfy the desired height and depth, the surface coat layer 1d which suppresses the protrusion height of the inorganic resist is formed on the inorganic resist layer 1c.

In a usual resist film structure, i.e., a structure in which a heat storage control layer and an inorganic resist layer are formed on a Si wafer without the surface coat layer 1d being formed, the protrusion is not appropriate for a groove shape when only the thickness of the inorganic resist layer and recording power are controlled. For example, in the state of protrusion to a desired height (to 25 nm), an optimum groove width is not necessarily obtained at the same time.

When the recording power is increased, both the protrusion height and width of a pattern are increased until they are saturated. However, in the state in which the inorganic resist protrudes to 25 nm, actually the half-width of the groove does not exceed 160 nm and does not reach 180 nm which is an optimum width for BD-R and BD-RE substrates.

Therefore, as the surface coat layer 1d, for example, a SiN film is preferably deposited to a thickness of about 10 nm to 20 nm on the surface of the inorganic resist.

Since the SiN film is very hard, the amount of protrusion of the inorganic resist is suppressed, and the same degree of protrusion is achieved by exposure with higher recording power than usual recording power. As a result, when the protrusion height reaches 25 nm, a wider groove than usual grooves is formed.

By utilizing this effect, the thickness of the surface coat layer 1d (SiN film) is appropriately controlled to simultaneously optimize the width and height of the groove.

In addition, protrusions of the inorganic resist are polycrystalline, thereby roughening the surface. However, when a dense SiN film is used as the surface coat film, the surface roughness of the protruding groove is improved, causing the effect of realizing lower noise.

Examples in an actual manufacturing test are described.

In an experiment, in order to optimize the thickness of the surface coat layer 1d composed of SiN to obtain a desired groove shape for BD-R and BD-RE, the thickness of the surface coat layer 1d was changed to prepare samples. In addition, a master stamper 10 was formed from a master having an optimum shape, and finally, signals of the master stamper 10 were directly measured by an evaluation machine. As a result, it was confirmed that the signal characteristics are the same as those of a mother stamper produced by a usual process. This is due to the fact that the signal characteristics in a stamper stage are considered the same as those of a completed optical disc.

An inorganic resist master 1 was used as each of the following three samples (Sample A, Sample B, Sample C).

Sample A

An inorganic resist master in which a heat storage control layer 1b of a-Si having a thickness of 120 nm and an inorganic resist layer 1c (tungsten-molybdenum oxide compound) having a thickness of 70 nm were formed on a master substrate 1a as a Si wafer. A surface coat layer 1d was not formed.

Sample B

An inorganic resist master in which a surface coat layer 1d of SiN was formed to a thickness of 12 nm on the inorganic resist layer 1c of Sample A.

Sample C

An inorganic resist master in which a surface coat layer 1d of SiN was formed to a thickness of 20 nm on the inorganic resist layer 1c of Sample A.

FIG. 9A shows the thickness of each layer of each of the samples.

Each of the samples was cut with recording power controlled so that during groove exposure, the protrusion height was 25 nm or less.

The common recording conditions (cutting conditions) other than the power are shown below.

Figure 7A:
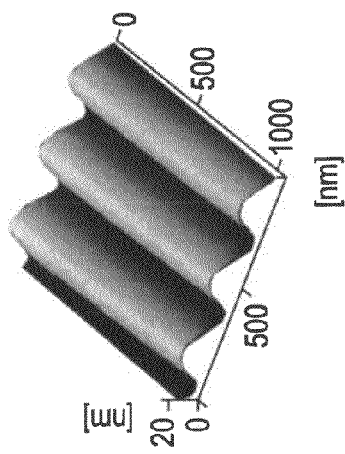
FIGS. 7A to 7C are drawings showing AFM observation images of a master as Sample B in an embodiment.

Recording optical system:
recoding wavelength λ=405 nm
objective lens NA=0.95
Recording pulse:
single-frequency pulse wave (frequency f=66 MHz)
recording pulse-emission duty=35%
Recording linear speed: 4.92 m/s
Track pitch: 0.32 μm The groove protrusion shape of each sample was observed with AFM (Atomic Force Microscope) to measure the height and half-width of the groove. The AFM observation images are shown in FIGS. 6A to 6C, 7A to 7C, and 8A to 8C. FIGS. 6A, 7A, and 8A each show an observation image in a planar direction, FIGS. 6B, 7B, and 8B each show an observation image in which protrusions are three-dimensionally displayed, and FIGS. 6C, 7C, and 8C each show an observation image of a sectional shape of protrusions.

The observation results are summarized in FIG. 9B.

As a result, it was confirmed that the shape of a protruding groove can be controlled by the thickness of the surface coat layer 1d of SiN.

As a groove shape for BD-R and BD-RE, the height of 26 nm and the half-width of 180 nm of Sample B are values closest to those of a groove formed by a usual process and are optimum in this experiment.

In Sample C, the surface coat layer 1d of SiN is excessively thick, and thus protrusions with a height of 22 nm or more cannot be formed. When recording power is further input, the groove width is excessively increased to affect the land, resulting in a decrease in the groove height.

Figure 7B:
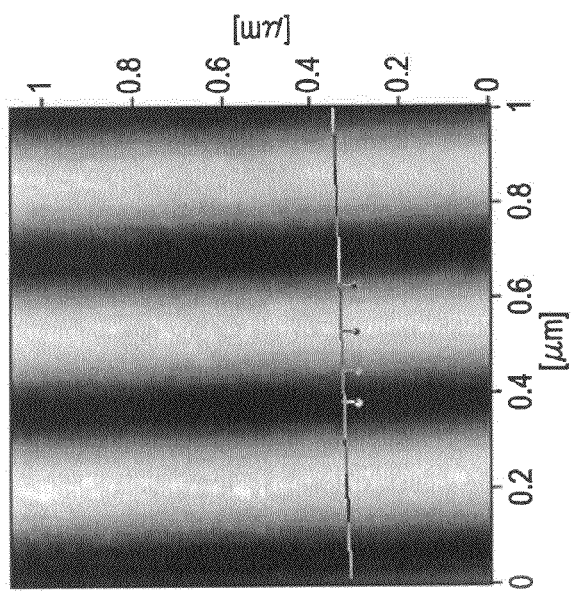
Figure 8B:
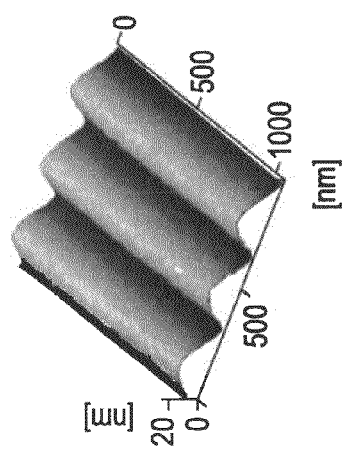
FIGS. 8A to 8C are drawings showing AFM observation images of a master as Sample C in an embodiment.
Figure 8A:
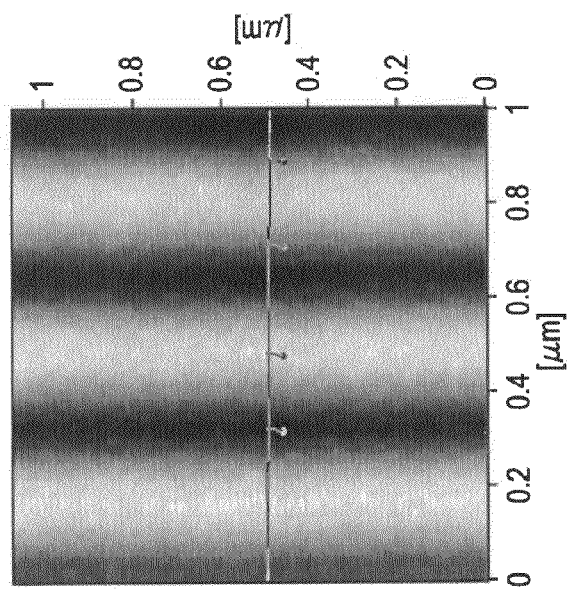
Figure 8C:
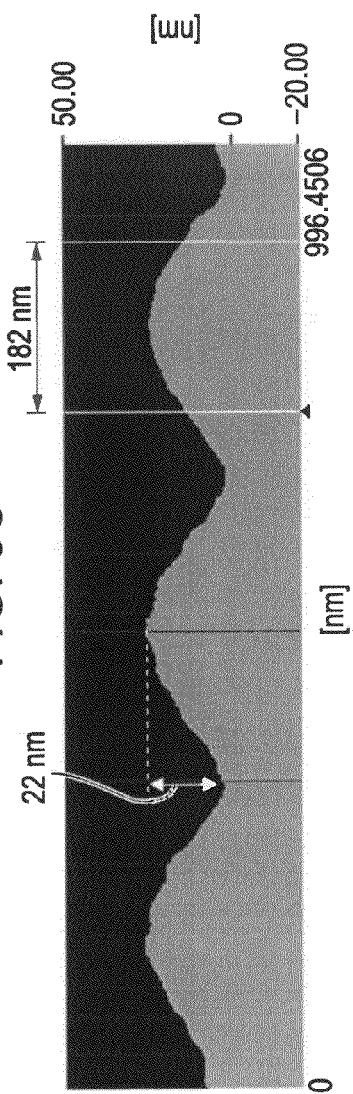
Figure 12A:
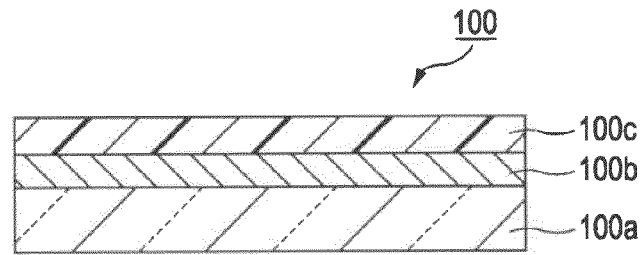
FIGS. 12A to 12C are drawings illustrating lithography of inorganic resist.
Figure 12B:
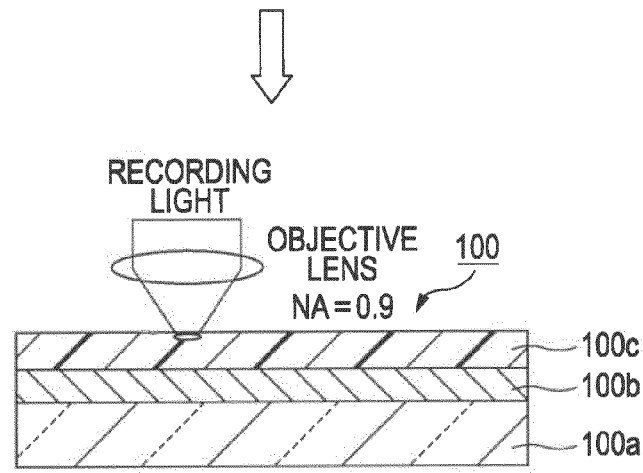
Figure 12C:
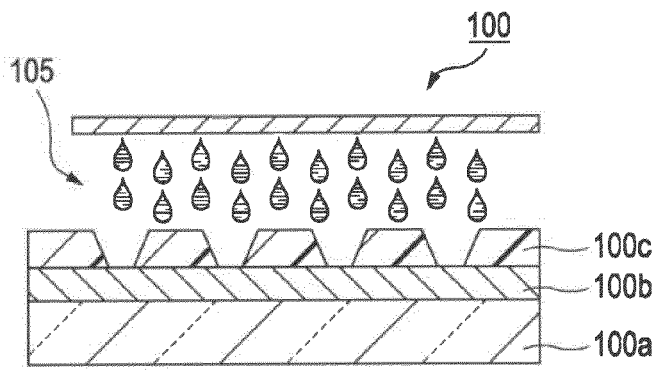
Figure 13A:
FIGS. 13A to 13I are drawings illustrating a related-art process for manufacturing a ROM disc.
Figure 13B:
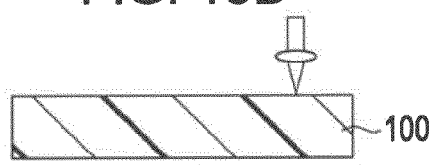
Figure 13C:
Figure 13D:
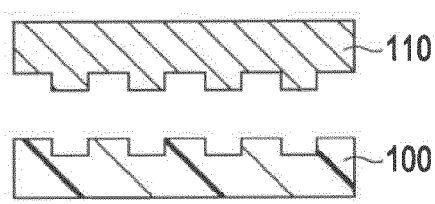
Figure 13E:
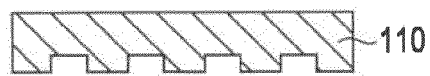
Figure 13F:
Figure 13G:
Figure 13H:
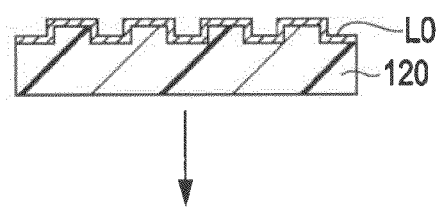
Figure 13I:
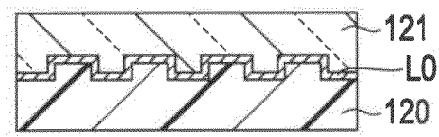

In the AFM observation images (3D-display) of FIGS. 6B, 7B, and 8B, significant roughness of protrusions/depressions is observed in the groove surface of Sample A not including the surface coat layer. However, in Sample B or Sample C including the SiN surface coat layer, the roughness is decreased, and the smooth arc-like shape is observed.

As described above, this is considered to be due to the phenomenon that surface protrusions/depressions produced by polycrystallization during exposure of the inorganic resist are suppressed by the dense SiN film.

Figure 7C:
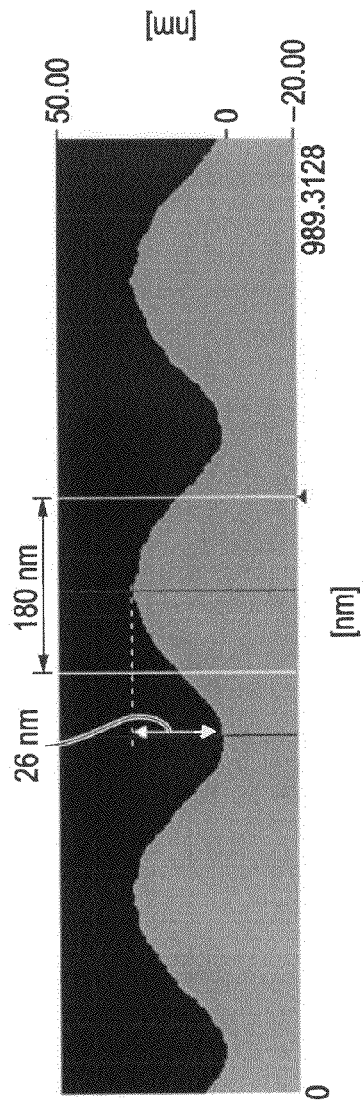

In particular, as seen from FIG. 7C, in Sample B, the groove/land sectional shape is a smooth, substantially sinewave shape and is thus different from a substantially trapezoidal shape which a usual groove/land sectional shape.

Next, evaluation of signal characteristics of a master stamper 10 produced from each sample is described.

The master stamper 10 was formed, without the development step, using each of the inorganic resist masters of Sample A not including the surface coat layer and Sample B including the surface coat layer 1d having a proper thickness and realizing proper protrusion as a groove.

However, in Sample B, the SiN film (surface coat layer 1d) on the surface of the master has no conductivity, and thus electroplating cannot be performed directly. Therefore, an inorganic resist was deposited to 5 nm to form a conductive film. Therefore, an electroplating process can be performed under the same conditions as those for a usual inorganic resist master. This corresponds to the surface conducting step (ST3) shown in FIG. 1A.

The master stamper produced, without development, from the inorganic resist master of each of Samples A and B has protrusions/depressions of groove/land which coincide with those of a mother stamper (refer to the mother stamper 111 shown in FIG. 15F) produced from a usual positive resist through development.

Therefore, a usual BD-R mother stamper of quality equivalent to product quality was added to the samples, and a light-transmitting layer (cover layer) having a thickness of 0.1 mm was formed on each of the stampers. Then, the signal characteristics of the three samples were compared using a Blu-ray disc reproduction apparatus. The evaluation items of stamper reproduction signals were the following three points (1), (2), and (3).

(1) CTS (Cross Track Signal)

This value is an indication of a groove width. When the DC reflected light quantity levels of the groove and land under tracking are IG and IL, respectively, CTS is represented by the following equation:

$$CTS = 2 \times (IG-IL)/(IG+IL)$$

When groove width=land width (=160 nm), CTS becomes zero, while when groove width >land width, CTS is a positive value. In BD-R or BD-RE, the groove is formed to be slightly wider than the land, and thus the CTS value is preferably +1 to +4%.

(2) NPP (Normalized Push-Pull Signal)

This value is mainly an indication of the groove depth. Since NPP is maximized at λ/8n (n: refractive index of substrate) of 33 nm, the NPP value increases as the thickness increases near the groove depth of 20 to 30 nm.

However, NPP slightly depends on the groove width and groove inclination angle.

With respect to the groove width, NPP is maximized at (track pitch)/2. A decrease in inclination angle is equivalent to shallowing of the groove, and NPP decreases near the decreased thickness.

(3) Groove Noise Level

In tracking of the groove, the total signal of reflected light condensed on a reproducing photodetector was taken out, and the frequency characteristics of groove noise were examined with a spectrum analyzer.

According to past examination, the groove noise measured on a stamper by this method is directly reflected in the groove noise of BD-R or BD-RE medium as a final product.

Therefore, this evaluation is considered as the most important item for determining the signal quality of a disc.

The stamper was subjected to reproduction at 2.46 m/s, which is a ½ linear speed to measure with a reproduction laser power of 0.30 mW within a range of 0 to 8 MHz. The spectrum analyzer was set so that PBW=30 kHz, and VBW=10 Hz.

Since a difference in the quantity of reflected light is reflected in proportion to the noise level, the values of the quantity of reflected light on an oscilloscope are also shown in FIG. 10.

FIG. 10 shows the results of measurement of the above-described three items for the master stampers formed from the inorganic resist masters of Samples A and B and a BD-R mother stamper formed by a usual process.

In comparison between Sample A and Sample B (blank master stamper), Sample B shows an increase in CTS value due to an increase in groove width. This supports the AFM measurement results shown in FIGS. 6A to 6C, 7A to 7C, and 8A to 8C.

Further, the noise level is about 7 dB at 3 MHz (linear speed=2.46 m/s) and about 3 dB at 6 MHz (linear speed=2.46 m/s). Therefore, Sample B is significantly improved. This is a sufficiently significant difference even when about 10%=0.5 dB as a decrease in reflectance is subtracted.

These two points indicate the effect of the SiN surface coat layer $1d$.

Next, Sample B is compared with the usual process product.

Both samples show substantially the same CTS value. The NPP value of the related-art process product is about 20% larger. This is possibly due to the fact that the groove of the related-art product has a trapezoidal sectional shape, while the protruding groove of Sample B has a sine-wave sectional shape (circular arc). It is supposed that a difference in groove inclination angle appears.

However, the NPP value of Sample B is 0.33 and has a margin for the NPP standard lower limit (0.25 as a criterion of stamper evaluation) and no problem.

In the noise spectrum, the reflectance of Sample B is about 10% higher, but the spectra are substantially the same over the whole measurement region (0 to 8 MHz). Therefore, Sample B is sufficiently practicable as a stamper for BD-R and BD-RE.

As described above, with respect to the typical evaluation items for the groove, signal evaluation was made directly on the stamper. As a result, it was confirmed that groove characteristics equivalent to those of the related-art process product are realized by the process of this embodiment. Namely, it is suitable that as in Sample B, the thickness of the SiN surface coat layer $1d$ is about 12 nm.

Although, in the embodiment, SiN is used as the material of the surface coat layer, another material, e.g., $SiO_2$ or the like, may be used in place of SiN as long as it has the same function.

6. Summary

The above-described embodiment is mainly intended to reduce defective factors by realizing an efficient process for producing a BD-R or BD-RE stamper and shorten the process time.

Therefore, with respect to the steps from master deposition to formation of a molding stamper, the manufacturing process of the embodiment is compared with the related-art manufacturing process.

Although the manufacturing process of the embodiment is compared with the related-art manufacturing process with reference to FIGS. 1A and 1B, the difference in process efficiency described below occurs.

The steps specific to the process of the embodiment include the master deposition step (ST1) in which the SiN surface coat layer $1d$ is deposited on the master and the surface conducting step (ST3) in which conduction sputtering is performed on the surface of the master after cutting. These steps have a relatively low failure rate and the time of each of the steps is estimated to about 10 minutes.

The steps specific to the related-art process include the alkali development step (ST12), the master stamper releasing step (ST14), and the master-mother transfer electroplating step (ST15).

The time of the alkali development step (ST12) is about 20 to 30 minutes, the time of the master stamper releasing step (ST14) is 10 to 20 minutes, and the time of the master-mother transfer electroplating step (ST15) is 90 to 150 minutes.

By omitting these steps, the total process time is shortened by 2 to 3 hours even if the time corresponding to the two added steps specific to the embodiment is subtracted.

In addition, the alkali development step and the master-mother transfer electroplating step, and the master stamper releasing step according to the method are wet processes using chemicals, and easily cause defects such as instability due to changes with time, an increase in defects due to chemical staining or remaining stains, and the like. From the viewpoint of improvement in productivity, it is very effective to avoid these defects by the embodiment.

As a result, the embodiment has the following advantages:

When a BD-R or BD-RE substrate is produced, usually, a plastic substrate is formed by injection molding using a mother stamper because a groove (exposed regions during mastering) is required to protrude toward the surface side of the substrate.

Therefore, in order to omit the step of transfer from the master stamper to the mother stamper, an inorganic resist having the property of protruding in an exposed region is used for groove pattern exposure of a master so that the inorganic resist is protruded to a desired shape, and then the master stamper is formed without the development step. In this case, unlike in a usual groove formed by development of positive resist, protrusions and depressions are inverted on the master, thereby eliminating the formation of the mother stamper.

Therefore, the development step and the master-mother transfer electroplating step, which have a high defective rate, may be omitted, thereby improving the manufacturing yield and realizing shortening of the process time by bout 2to 3 hours.

As described above for the two-layer disc and the four-layer disc with reference to FIGS. 3C to 3F, two master stampers for recording layers L0 and L1 are used in the two-layer disc, and four master stampers for recording layers L0 to L3 are used in the four-layer disc.

As described above, in the embodiment, in consideration of the effect that the steps until formation of the master stamper are made very efficient, this effect is further enhanced when many master stampers are formed for a multilayer disc.

Next, in order to control the protruding groove on the inorganic resist master to a desired shape, the SiN surface coat layer 1d is formed on the inorganic resist. Since the surface coat layer 1d composed of SiN has the function to suppress protrusion of the inorganic resist, when the film thickness is properly set, the height and width of the protruding groove can be simultaneously optimized. Namely, a stamper on which a groove with proper height (depth) and width is formed, and further an optical disc can be manufactured from a master not passed through a development step.

As a measure against groove noise, it is effective to form the SiN surface coat layer 1d. Exposed portions of the inorganic resist are polycrystalline, and thus exposure without a surface coat roughens the groove surface, thereby increasing groove noise. However, a SiN film having a dense surface suppresses the surface roughening and prevents deterioration of noise.

As a result, it is possible to manufacture a molding master stamper having signal quality equivalent to a usual production mother stamper.

For example, as seen from the above-described Sample B, when a groove/land sectional shape is a smooth, substantially sine-wave shape, the sectional shape is considered to contribute to improvement in noise characteristics. The shape further has a release improving effect. That is, separation between an inorganic resist master and a master stamper during molding of the master stamper, and separation between the master stamper and a disc substrate during molding of the disc substrate are facilitated as compared with a usual trapezoidal sectional shape. Further, in the case of a multilayer disc, stamper transfer and separation are performed for each recording layer, and thus improvement in detachability greatly contributes to improvement in efficiency of the process.

Although, in the embodiment, an example in which the present invention is applied to the manufacture of BD-R or BD-RE is described, of course, application is not limited to the manufacture of BD-R or BD-RE. According to circumstances, the present invention may be applied to ROM-type discs.

Further, in future recordable optical discs, it is estimated that the density is increased using a lens having higher NA (for example, solid immersion lens with NA>1) while maintaining the same groove structure. In such a case, the method of the present invention is effective.

The present application contains subject matter related to that disclosed in Japanese Priority Patent Application JP 2008-245355 filed in the Japan Patent Office on Sep. 25, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A method for manufacturing an optical disc comprising the steps of:
    performing laser exposure of an inorganic resist master on which a photosensitive layer is formed using an inorganic material, which protrudes in an exposed region, and a surface coat layer is formed on the surface of the photosensitive layer in order to control the shape of protrusion;
    transferring the shape of protrusion formed by the laser exposure on the inorganic resist master to produce a stamper on which a portion corresponding to the shape of protrusion is a depression;
    forming a resin substrate using the stamper so that a portion corresponding to the shape of protrusion is a protrusion; and
    forming a predetermined layer structure on the resin substrate to produce the optical disc,
    wherein SiN is used for the surface coat layer.

2. The method according to claim 1, wherein the laser exposure is performed to form a groove pattern corresponding to a recording track on the produced optical disc.

3. The method according to claim 1, wherein the stamper is a metal stamper.

4. The method according to claim 1, wherein the shape of protrusion formed in a laser exposed portion of the inorganic resist master has a substantially sine-wave sectional shape.

5. A method for manufacturing a stamper comprising the steps of:
    performing laser exposure of an inorganic resist master on which a photosensitive layer is formed using an inorganic material, which protrudes in an exposed region, and a surface coat layer is formed on the surface of the photosensitive layer in order to control the shape of protrusion; and
    transferring the shape of protrusion formed by the laser exposure on the inorganic resist master to produce a stamper on which a portion corresponding to the shape of protrusion is a depression,
    wherein SiN is used for the surface coat layer.

6. The method according to claim 1, wherein the SiN has a thickness of 10 nm to 20 nm.

7. The method according to claim 1, wherein the protrusions are polycrystalline.

8. The method according to claim 1, wherein the SiN is polycrystalline.

9. The method according to claim 5, wherein the SiN has a thickness of 10 nm to 20 nm.

10. The method according to claim 5, wherein the protrusions are polycrystalline.

11. The method according to claim 5, wherein the SiN is polycrystalline.

* * * * *